Patented May 15, 1951

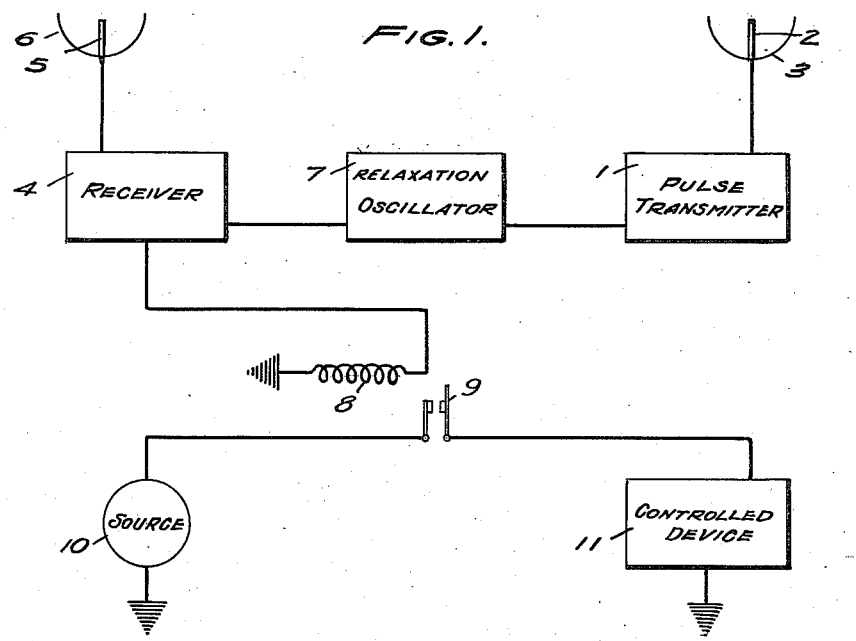

2,552,579

UNITED STATES PATENT OFFICE 2,552,579

RADIO PULSE-ECHO AUTOMATIC CONTROL SYSTEM

Russell G. Pelton, Alexandria, Va.

Application February 4, 1943, Serial No. 474,756

6 Claims. (Cl. 343—7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a mechanism for and method of automatically controlling a device in response to a radio wave reflected by an object located within an area having a selected relation to the controlled device.

One object of my invention is to provide means for controlling any chosen device in response to a radio wave transmitted, reflected from an object, and received in such a way as to locate the object in direction with respect to said device, said means being responsive to said radio wave only for a short period of time so as to locate the object as being within a definite distance of said device.

Another object of my invention is to provide a control for a gun, which control automatically fires the gun when a target is within proper aim and distance.

Still another object is to control a chosen device for operation when an object moves to an area within a predetermined distance and direction from said device.

Yet another object is to control a chosen device for operation when said device moves so that an object is within an area of predetermined distance and direction from said device.

More specifically one embodiment of my invention comprises a transmitter of radio waves adapted to emit a wave pulse with a highly directional characteristic, a radio receiver adapted to receive a portion of said wave which has been reflected from an object within a selected area and to be highly directional for reception of such a reflected wave, a time-delay mechanism adapted to place said radio receiver in signal passing condition only for a short period of time and a device controlled by a signal which has passed through said radio receiver. The directional characteristics of said transmitter and of said receiver locate an object as being in one direction from the controlled device. The time-delay mechanism locates this object as being within range or within a certain distance from the controlled device.

Another embodiment of my invention comprises: a radio transmitter, whose output is beamed along one axis; a radio receiver having at least three antennas, each screened from the others, whereby simultaneous reception of a signal by said antennas locates said signal as having proceeded from a point within a selected area; a mechanism controlling the signal output from at least one of said controlled antenna through said radio receiver only for a short period of time, whereby transmission of a signal locates the signal received by said antenna as having proceeded from a point within a selected distance from said antenna; and a device activated in response to said transmitted signal.

In the drawings:

Figure 1 is an illustration of apparatus wired for operation in accordance with this invention.

Figure 2 shows a modified form of the invention.

The embodiment of my invention disclosed in Figure 1 comprises a radio transmitter 1 having antenna 2 with reflector 3 and adapted to emit a signal in the form of consecutive pulses in a sharply defined radio beam. Radio receiver 4 has an antenna 5 with reflector 6, thereby having sharp directional characteristics.

A form of the well known horn type radiators may be used in place of the antennas 2 and 5, and the reflectors 3 and 6 for a narrow directional beam if desired.

A signal blocking circuit 7 of the well known relaxation oscillator type is connected to transmitter 1 and also to receiver 4. The output of signal blocking circuit 7 is applied as a bias to receiver 4 in a well known manner to block the receiver so that it will not pass a signal received by antenna 5. The particular relaxation oscillator or multivibrator circuit used is that in which one tube is normally conducting and the other tube non-conducting as explained by Frederick E. Terman in his book entitled "Radio Engineering" published and copyrighted in 1932 by the McGraw Hill Book Company, at pages 273–277.

Relaxation oscillator 7 is also connected to transmitter 1 so as to receive preferably from the timer or synchronizer unit of the transmitter a portion of the signal generated for transmission. This portion of signal is applied as a trigger voltage to the oscillator 7 so that the output is interrupted. An RC circuit with a desired time constant may be used in the well known manner to control the period of time during which there is no output from the relaxation oscillator or signal blocking circuit 7. The manner in which the output of the relaxation oscillator 7 is interruped by the trigger voltage and the choice of resistance and capacity values for the desired time constant is well understood by those skilled in the art but again may be found in the Terman book previously referred to.

The output of receiver 4 is fed to a relay, illustrated by coil 8 and contacts 9, connected between a source of power 10 and desired device 11 which is to be controlled.

The operation is as follows: Transmitter 1 emits from antenna 2 a beam of radio waves in the form of pulses having a sharply defined directional characteristic. This beam may be either transmitted in a fixed direction or antenna 2 may be oscillated so that the beam sweeps or scans a selected area. If any object intercepts this beam, the beam or a portion thereof is reflected thereby. The antenna 5 is located or oscillated with respect to antenna 2 so as to receive the reflected beam or portion. Simultaneously with the signal from antenna 2 a signal is conducted to relaxation oscillator 7, causing relaxation oscillator 7 to cut off, and thereby unblock receiver 4 for a limited period of time and permit receiver 4 to allow any signal received by antenna 5 to pass therethrough. The passage of a signal through receiver 4 energizes coil 8, which in turn, causes contacts 9 to close and thus closes circuit from a source 10 of power to the controlled device 11.

A certain time is required for the beam emitted by antenna 2 to travel to the object which intercepts and reflects the beam and then to travel to antenna 5. During this time the receiver 4 is free to receive a reflected signal since the portion of signal transmitted direct to relaxation oscillator 7 has caused it to release the block on receiver 4. After a short period of time dependent upon the time constant, relaxation oscillator 7 again flip-flops or produces an output, blocking receiver 4.

Thus if a signal returns by reflection from the distant object during the time receiver 4 is free to receive, it will be amplified in receiver 4 and applied to coil 8, closing contacts 9 to furnish power for operation of device 11.

The range feature of the invention is thus readily apparent since the distance of an object from the apparatus will determine the time a signal will return to be either received or rejected by receiver 4.

Figure 2 shows a modification of my invention adapted for operation with existing equipment in which the pulse transmitter 1 with its antenna 2 and reflector 3 are the same as described above. However, the radio receiver 44 is divided into at least three channels, each having a separate antenna 51, 52 and 53, respectively. Each of these antennas is shielded from the others by a screen 66. A relaxation oscillator 7 controls the blocking and unblocking of at least one of the channels of radio receiver 44. The outputs of the separate channels of radio receiver 44 are conducted to coils 81, 82 and 83, which coils control contacts 91, 92 and 93, respectively. Contacts 91, 92 and 93 are all part of a series circuit including a source 10 of power and the controlled device 11.

The operation of this modification of my invention is substantially the same as that of the embodiment already described. It will be seen, however, that the reflected signal must be received practically simultaneously by all three antennas 51, 52 and 53, in order for the output of each of these antennas to pass through the corresponding channel of radio receiver 44 while these channels are still unblocked by relaxation oscillator 7. The substantially simultaneous reception of the reflected signal by the antennas 51, 52 and 53 locates the object from which the reflection occurs in direction with respect to the antennas and consequently, to the controlled device. The operation of relaxation oscillator 7 locates the object from which the reflection occurs in distance from the controlled device, as was explained above.

One specific application of my invention is to the control of a gun mounted on an aircraft. In such case controlled device 11 would be the trigger of a gun and the shields for antenna of Figure 2 are the wings and fuselage of a plane. It is apparent however, that the invention is not so limited and that other equivalent devices operable by a relay may be used constituting the controlled device.

What I claim as my invention and desire to secure by Letters Patent of the United States is:

1. A control device responsive to a wave reflected from an object within a sharply defined area, said device comprising, a transmitter of radio waves arranged to transmit waves into said area so that said waves are reflected by an object there, a plurality of receiving antennas shielded from each other and arranged so that a signal received simultaneously by each antenna must have proceeded from a point located substantially within said area, a radio receiver having a plurality of channels each connected to one of said receiving antennas, a signal blocking circuit connected to said transmitter and connected to said receiver so as to control the opening and closing of at least one of said channels and having a time constant such that the controlled channel only remains open for a limited period of time predetermined solely by adjustment of said blocking circuit, and a plurality of relays each having its coil connected under the control of one of said channels and having its contacts connected in series with those of the other relays so that electricity can only be transmitted through said contacts when each of said relay coils is energized.

2. An apparatus for actuating a controlled device when an object is within a predetermined range both as to position and distance, said apparatus comprising, a plurality of electric switches having their contacts connected in series with each other and with the controlled device, a plurality of coils each located so as to cause the opening and closing of one of said switches upon the energization of said coil, a radio receiver having a plurality of channels, the output of each of said channels being connected to one of said coils so as to energize said coil upon the passage of a signal through said channel, a plurality of receiving antennas having co-ordinated directive qualities and shielded from each other so that only simultaneous reception of a signal by said antennas locates the point from whence said signal emanates as being within said predetermined range and each having its output connected to one of said channels to feed a signal thereto, a signal blocking circuit having electrical connection with at least one of said channels so that energization of said signal blocking circuit by the receipt of a signal thereby, puts the channel controlled thereby in signal-transmitting-condition for a limited period of time predetermined solely by said signal blocking circuit so that signals can only be transmitted by said channels if said signals have been reflected by an object within said range and a radio transmitter adapted to transmit a signal against the object whence it may be reflected to said receiving antennas and having a connection which simultaneously transmits a portion of said signal to said signal blocking circuit to energize it.

3. In an automatic control device, a radio receiver comprising, a plurality of antennas, means shielding said antennas from each other, a plurality of channels each connected to one of said antennas so as to transmit a signal received by the antenna through said channel, a plurality of coils each connected to one of said channels so as to be energized when a signal is transmitted through the channel, a plurality of switches each connected under the control of one of said coils so that the opening and closing of said switches is controlled by the energization of said coils, said switches having contacts connected in series and adapted to form a closed circuit when all of said switches are closed, and a signal blocking circuit connected so as to normally maintain at least one of said channels in condition not to transmit said signals and, when energized, to maintain said controlled channel in condition to transmit said signals for a limited time.

4. An automatic control device responsive to a wave reflected from an object located within an area which it is desired to control, said device comprising, a radio transmitter having a directional antenna transmitting a sharply defined beam into said area which beam may be reflected by an object within said area, a radio receiver having a directional antenna receiving a sharply defined beam reflected from an object within said area, a signal blocking circuit connected to receive a signal directly from said transmitter simultaneously with the transmission of said beam and connected to said radio receiver to block said receiver and to place said receiver in signal-receiving and passing-condition for a limited period of time said period of time being determined solely by said signal blocking circuit, whereby a signal received by said receiving antenna can only pass through said radio receiver within a short time after said signal blocking circuit has received said directly transmitted signal, a relay connected to said radio receiver so as to be energized by a signal passing through said radio receiver, and a device connected under the control of said relay and operated when said relay is energized.

5. An automatic control device responsive to a radio wave reflected from an object located within an area which it is desired to control, said device comprising, a radio transmitter for transmitting a beam having directional intensity into said area which beam may be reflected by an object within said area, a radio receiver for receiving a portion of said beam which has been reflected by an object within said area, said receiver having a plurality of antennas shielded from each other, a signal blocking circuit connected to receive a signal directly from said transmitter prior to the reception of said reflected portion and connected to said radio receiver to place said radio receiver in signal receiving and passing condition for a limited period of time, said period of time being determined solely by said signal blocking circuit whereby a signal received by said radio receiver can only pass therethrough within a predetermined limited time after said signal blocking circuit has received said directly transmitted signal, and a mechanism which it is desired to control connected so as to be responsive to a signal passing through said radio receiver.

6. An automatic control system including a transmitter of radio signals, an antenna for propagating said signals in a desired direction, a receiver for reception of a portion of said signal reflected from an object, said receiver having a plurality of antennas, a device desired to be controlled, power means for operation of said device, means for furnishing said power to said device when a signal is received by said receiver simultaneously on each of said plurality of antennas and independent of the signal repetition rate, a pulse generating circuit generating pulses having a predetermined desired duration for rendering said receiver sensitive for reception of said signal for a limited period of time after transmission thereof.

RUSSELL G. PELTON.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,055,883 | Terry | Sept. 29, 1936 |
| 2,176,469 | Moueix | Oct. 17, 1939 |
| 2,399,426 | Bradley | Apr. 30, 1946 |
| 2,406,316 | Blumlein | Aug. 27, 1946 |
| 2,409,448 | Rost | Oct. 15, 1946 |
| 2,409,462 | Zworykin | Oct. 15, 1946 |
| 2,417,136 | Smith | Mar. 11, 1947 |
| 2,421,785 | Hathoway | June 10, 1947 |
| 2,422,334 | Bedford | June 17, 1947 |
| 2,455,673 | Hansell | Dec. 7, 1948 |
| 2,468,032 | Busignies | Apr. 26, 1949 |

FOREIGN PATENTS

| Number | Country | Date |
|---|---|---|
| 113,233 | Australia | June 2, 1941 |
| 764,537 | France | Mar. 5, 1934 |